Figure 1:
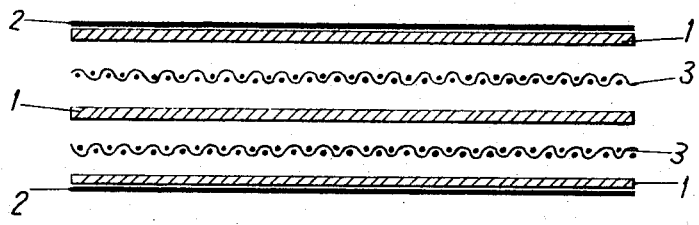

United States Patent [19]
Ravel

[11] 3,769,146
[45] Oct. 30, 1973

[54] LIGHT NON-INFLAMMABLE LAMINATES
[75] Inventor: Jean Ravel, Lyon, France
[73] Assignee: Rhone-Poulenc S.A., Paris, France
[22] Filed: May 23, 1972
[21] Appl. No.: 256,040

[30] Foreign Application Priority Data
May 25, 1971   France .............................. 7118854

[52] U.S. Cl................... 161/79, 161/84, 161/93, 161/98, 161/205, 161/403, 161/182, 161/192, 161/193
[51] Int. Cl............................................. B32b 5/00
[58] Field of Search .................. 161/79, 82, 84, 85, 161/93, 156, 205, 213, 224, 403

[56] References Cited
UNITED STATES PATENTS
3,231,451   1/1966   Gazelle ............................... 161/205
3,677,882   7/1972   Jahns .................................. 161/403
2,561,891   7/1951   Tucker................................. 161/403
3,700,538   10/1952  Kennedy.............................. 161/403

Primary Examiner—George F. Lesmes
Assistant Examiner—James J. Bell
Attorney—Richard K. Stevens et al.

[57] ABSTRACT

Non-inflammable laminates which on combustion give only small and non-toxic amounts of fumes and gases have a thin metal foil facing on an asbestos paper support and a core of glass fibre fabric, polyamide-imide fibre fabric, or polyimide fibre fabric, optionally with an asbestos fabric, the whole being bonded together with an organosilicon polymer or polyimide.

8 Claims, 3 Drawing Figures

LIGHT NON-INFLAMMABLE LAMINATES

The present invention relates to lightweight, non-inflammable laminates.

The losses of human lives in fires which have occurred unexpectedly either in vehicles (e.g., aeroplanes, boats and land vehicles) or in public places (e.g., department stores, cinemas and theatres) have led those responsible for public safety to make stringent regulations relating to materials used in such vehicles and places, especially in respect of their non-inflammability, the amount of fumes they produce on combustion and the nontoxicity of the by-products of pyrolisis. The use of inorganic substances for materials which must meet these criteria is acceptable for terrestrial installations where weights are of secondary importance compared with cost. For aerial transport, however, the weight must be as low as possible especially in structures which do not contribute to the pay load.

The present invention provides a non-inflammable laminate weighing less than about 2,800 g./m² comprising a metal foil facing less than 50 microns thick, an asbestos paper support for said metal foil facing, and a core comprising one or more layers of a glass fibre fabric, a polyimide-amide fibre fabric, or a polyimide fibre fabric and optionally in addition of an asbestos paper or asbestos felt, which paper or felt is unreinforced or reinforced with glass fibres, all the non-metallic layers of the laminate being bonded together with an organosilicon polymer binder or with a polyimide binder. Such laminates, on combustion, evolve only very small and non-toxic amounts of fumes and gases.

The weight of the new laminates naturally varies with their thickness. Thus when the laminates are 1 mm. thick, and are to be used in aeronautics, their weight preferably does not exceed about 1,600 g/m² (generally the requirement is that the weight should be from 800 to 1,400 g/m²), i.e., their density is preferably not above 1.6 g./cm³.

The organosilicon polymers which may be used as binders are commonly available resins, which are sold commercially either dissolved in solvents or undiluted. They are described, for example, in French Pat. No. 1,568,812. The polyimide binders, which are well known to have good heat resistance, are described in, for example, French Pat. Nos. 1,365,545 and 1,555,564.

Suitable metal foils are of, for example, aluminium, stainless steel, copper, titanium and alloys of these metals. Their thickness should not exceed a few tens of microns and, at most, 50 microns. They are glued to the asbestos paper supports by conventional glues, for example, those based on alkali metal silicates or on organic orthosilicates.

The new laminates are prepared by the usual techniques. The materials, impregnated with the binders, are stacked in a mould and then heated at temperatures and under pressures, which depend on the nature of the binders used. However, low pressures, slightly greater than 1 bar, and temperatures in the region of 150°C. lead to good results even after only a comparatively short period of time and can be used in appropriate circumstances. The thickness of the laminates obtained is obviously a function of the thickness of the materials, their number, and the amount of binders used. However, in order that these laminates, composed of layers of dense substrates and of binders, should weigh not more than 1,600 g./m² for a thickness of 1 mm., the amount of binder is chosen so as not to exceed this limit. In general, the percentage by weight of the binder, based on the weight of the laminate, is from 5 to 60 percent, but it is preferably 15 to 35 percent, taking account of the requirements imposed on the laminates.

The laminates of the invention can be machined by any of the common methods of cutting and piercing. Furthermore, their surface impermeability allows periodic cleaning with sponges or scraper sponges soaked in aqueous solutions of a wide range of detergents and their uniformity in colour makes unnecessary the application of coloured paints or of decorative plastic films, though such can be applied if desired.

They can be used in all fields where there is need for materials which are non-inflammable and which evolve only a small amount of non-toxic fumes and gases at temperatures greater than 1,000°C. They are, however, especially suitable for masking the heat insulations of the cabins and storage spaces of aeroplanes and for being fixed by screws onto the transverse members and longitudinal struts of the cabins or onto the frames of the storage spaces.

The following Examples illustrate the invention.

EXAMPLE 1

A laminate as shown in FIG. 1 of the accompanying drawings is prepared by superposing, in a first stage, on a metal plate which has previously been coated with a non-stick agent, flat materials, the dimensions of which are slightly less than 40 × 40 cm, impregnated with organosilicon polymers.

This impregnation is carried out by immersion for about 15 minutes in a bath consisting of (the parts being by weight):

methylpolysiloxane resin with $CH_3SiO_{1.5}$ units — 20 parts
ethyl silicate — 8.3 parts
5 percent aqueous hydrochloric acid solution — 1.7 parts
methanol — 70 parts followed by evaporation of the solvent by passage through a ventilated oven, heated to 90°C.

The order of a superposition and the nature of the materials used are as follows:

1.
A paper of chrysolite asbestos fibres 1 on one face of which there is glued a thin aluminium foil 2, this metallised face being in contact with the metal plate of the mould. This assembly, hereafter called the asbestos-aluminium complex, weighs 280 g/m².

2.
A degreased glass fabric 3 of the satin type, weighing 87 g/m².

3.
A paper of chrysolite asbestos fibres 1 weighing 200 g/m².

4.
A glass fabric 3 like that mentioned under (2).

5.
An asbestos-aluminium complex like that already used under (1), the metallised face being towards the outside.

In a second stage, the stack is covered by another metal plate, the face of which, resting on the materials, is also coated with a non-stick reagent. The mould, formed in this way, is placed between the platens of a press. The press is closed and the mould is held at 250°C. for 90 minutes under a pressure of 80 kg/cm². A 1 mm. thick laminate is obtained which weighs 1,230 g/m² and contains about 25 percent by weight of organosilicon polymers.

It satisfies the tests laid down first by Standard Specification N.P.R.M. 6933 relating to the non-inflammability and secondly by Standard Specification N.P.R.M. 6930 relating to the evolutions of small amounts of non-toxic fumes and gases. These Standard Specifications were published in July, 1970 by "Department of Transportation of the American Aviation Association."

The laminate is thus non-inflammable and, when strongly heated, evolves only very small amounts of fumes and gases which are not dangerous. Furthermore, it can be machined easily.

EXAMPLE 2

Figure 2:
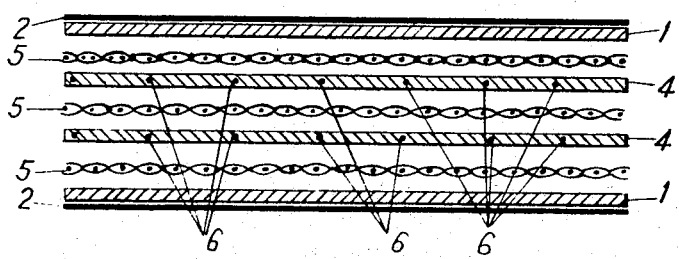

A laminate, as shown in FIG. 2, is prepared by following the procedure of stacking of Example 1. Before being superimposed, the materials are impregnated with organosilicon polymers by immersion in a solution of resin having the following composition (the parts being by weight):
organopolysiloxane resin consisting of $(CH_3)_2SiO$ and $C_6H_5SiO_{1.5}$ units in the ratio 1/3 — 20 parts
toluene — 76.6 parts
choline octoate — 2 parts
zinc octoate — 1.4 parts
followed by evaporation of the solvent by passage through a ventilated oven heated to 110°C.

The order of superposition and the nature of the materials are as follows:
1.
The asbestos-aluminium complex used in Example 1, weighing 280 g/m², the metallised face 2 being in contact with the plate of the mould.
2.
A degreased glass fabric 5 of the satin type, weighing 55 g/m².
3.
A felt of asbestos 4, reinforced with glass filaments 6, weighing 320 g/m².
4.
A glass fabric 5 like that used under (2).
5.
A felt of asbestos 4 like that used under (3).
6.
A glass fabric 5 like that used under (2).
7.
The asbestos-aluminium complex of the type used under (1), the metallised face 2 being turned towards the outside.

The whole is then heated at 150°C. for 1 hour 30 minutes, under a pressure of 10 kg/cm². The 1.5 mm. thick laminate obtained weighs 1,600 g/m² and contains about 17 percent by weight of organosilicon polymers. It satisfies the tests laid down by the Standard Specifications N.P.R.M. 6933 and 6930 and is easy to cut up and to pierce with holes.

EXAMPLE 3

A laminate is prepared by the stacking technique described in Example 1. Before being superposed, the materials are impregnated with a fluid organopolysiloxane polymer, catalysed by 1.5 percent of its weight of dicumyl peroxide, of viscosity 10,800 cSt at 20°C., consisting of $C_6H_5SiO_{1.5}$, $(C_6H_5)_2SiO$, $CH_3(CH_2=CH)SiO$, $(CH_3)_2SiO$ and $(CH_3)_3SiO_{0.5}$ units in the respective ratio 10/35/40/8/7.

The order of superposition and the nature of the materials are as follows:
1.
An asbestos-aluminium complex like that used in Example 1, but weighing 280 g/m², the metallised face being in contact with the plate of the mould.
2.
Two degreased glass fabrics, each weighing 308 g/m².
3.
An asbestos-aluminium complex like that used under (1), the metallised face being turned towards the outside.

The assembly is then heated at 150°C. for 1 hour under a pressure of 10 kg/cm². The 1 mm. thick laminate obtained weighs 1,550 g/m² and contains 26 percent by weight of organosilicon polymer. It has a flexural strength, measured in accordance with Standard Specification A.S.T.M. 790—63, of 8.5 kg/mm² and a tear strength of 20 kg. Furthermore, it satisfies the requirements of Standard Specifications N.P.R.M. 6933 and 6930.

To measure the tear strength, a 5 mm. diameter hole is pierced in a sample of the laminate near one edge, the edge of the hole being at its nearest point, 5 mm. from the edge of the laminate. A metal rod which is firmly fixed to the movable part of a tensometer is threaded into the hole and the part of the sample opposite the hole is held between the fixed jaws of the tensometer. The movable part is then caused to travel at a speed of 14 mm. per minute until the sample tears at the hole. At this moment, the tensometer records the tear strength, which is found to be 17 kg.

EXAMPLE 4

Figure 3:
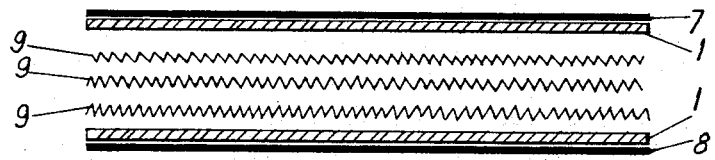

A laminate as shown in FIG. 3 is prepared by following the stacking procedure of Example 1. Before being superposed, the materials are impregnated with an organic prepolymer by immersion in a solution having the following composition (the parts being by weight):
prepolymer prepared by heating 15 parts of N,N'-4,4'-diphenylmethane-bis-maleimide with 8.29 parts of bis-(4-amino-phenyl)-methane for 1 hour at 120°C.—45 parts
N-methylpyrrolidone — 38.5 parts
xylene — 16.5 parts
followed by evaporation of the solvents by passage through a ventilated oven, heated to 160°C.

The order of superposition and the nature of the materials are as follows:
1.
A paper of chrysolite asbestos fibres 1 on one face of which is glued a thin stainless steel foil 8, this metallised face being in contact with the metal plate of the mould. The complex weighs 264 g/m².
2.
Three fabrics 9 of polyimide-amide fibres, each weighing 90 g/m².
3.
A paper of chrysolite asbestos fibres 1 on one face of which is glued a thin copper foil 7, this metallised face being towards the outside of the stack. This complex weighs 246 g/m².

The assembly is then heated for 1 hour at 180°C., under a pressure of 15 kg/cm², followed by 24 hours at 250°C. in a ventilated oven. The 0.9 mm. thick laminate obtained weighs 1,014 g/m² and contains about 23 percent by weight of polyimide binder; it satisfies the tests laid down by Standard Specifications N.P.R.M. 6933 and 6930 and can be machined easily.

I claim:

1. A non-inflammable laminate weighing less than about 2,800 g/m² comprising a metal foil facing less than 50 microns thick, an asbestos paper support for said metal foil facing, and a core comprising one or more layers of a glass fibre fabric, a polyimide-amide fibre fabric, or a polyimide fibre fabric and optionally in addition of an asbestos paper or asbestos felt, all the non-metallic layers of the laminate being bonded together with an organosilicon polymer binder or with a polyimide binder.

2. A laminate according to claim 1 having on both faces a said metal foil facing with an asbestos paper support.

3. A laminate according to claim 1 in which the core comprises two layers of glass fibre fabric having an asbestos paper sandwiched therebetween.

4. A laminate according to claim 1 in which the core comprises three layers of glass fibre fabric alternating with two layers of asbestos felt reinforced with glass fibres.

5. A laminate according to claim 1 in which the core comprises two adjacent layers of glass fibre fabric.

6. A laminate according to claim 1 in which the core comprises three adjacent layers of a polyamide-imide fibre fabric.

7. A laminate according to claim 1 having a density not above 1.6 g/cm³.

8. A laminate according to claim 1 comprising 15 to 35 percent by weight of the said binder.

* * * * *